United States Patent [19]

Betts et al.

[11] 3,723,971

[45] Mar. 27, 1973

[54] SERIAL LOOP COMMUNICATIONS SYSTEM

[75] Inventors: William K. Betts; Alexander P. Sawtschenko, both of Raleigh, N.C.

[73] Assignee: International Business Machines Corporation, Armonk, N.Y.

[22] Filed: Dec. 14, 1971

[21] Appl. No.: 207,862

[52] U.S. Cl. .............340/163 R, 340/147 R, 325/55, 343/177

[51] Int. Cl. ..............................................H04q 9/00

[58] Field of Search ...325/55, 58; 343/177; 340/150, 340/151, 152, 163

[56] References Cited

UNITED STATES PATENTS

| | | | |
|---|---|---|---|
| 3,289,165 | 11/1966 | Hawley et al. | 340/151 |
| 3,601,806 | 8/1971 | Heimbigner | 340/151 |
| 3,656,112 | 4/1972 | Paull | 340/151 |

*Primary Examiner*—Maynard R. Wilbur
*Assistant Examiner*—Joseph M. Thesz, Jr.
*Attorney*—John B. Frisone et al.

[57] ABSTRACT

A communications system including a central station connected in a series loop with a plurality of remote stations and in which under control of said central station, the remote stations in the order of their physical position transmit data to the central station.

5 Claims, 7 Drawing Figures

SERIAL LOOP COMMUNICATIONS SYSTEM

FIELD OF THE INVENTION

The invention relates to communications systems in general and more particularly to serial loop communications systems in which data is transmitted in one direction around the loop.

DESCRIPTION OF THE PRIOR ART

Serial loop data communications systems have been known for some time. They utilize a number of different forms of control. The control techniques may be divided into two broad categories. In the first category, messages from and to the connected terminals are broken up into segments and transmitted within predetermined time slots via the loop. The time slots may be permanently assigned to a given terminal in which case each terminal must be provided with its own time slot. Such systems are inefficient in their use of the communications capacity since during periods of inactivity, the channel capacity represented by the assigned time slot is wasted. Alternative control techniques have been proposed in which a limited number of time slots are shared amongst a larger number of terminals. The assignment of the limited number of slots may be accomplished in many different ways. A further discussion of these techniques is unnecessary since they are not of more than passing interest to the invention disclosed herein.

The second category includes control techniques which permit variable length messages to be transmitted as a single contiguous entity. This category is particularly suitable for use with relatively low speed communications channels such as voice grade telephone lines which connect large numbers of terminals in a series loop since a small percentage of the channel capacity is devoted to overhead items such as addressing, control and transmission error checking.

An early system of this type was described by J. M. Unk in an article entitled, "Communication Networks for Digital Information," published in the IRE Transactions on Communications Systems, Dec. 1960. This system did, however, have a maximum limitation placed on message length and therefore does not meet all the requirements of the category. In addition, expanding the message length would be impractical since it would introduce substantial delay into the communications path. Such delay would increase substantially, for long messages at least, the turn around time. That is, the time delay between the time a message is sent by a terminal until it receives a reply or acknowledgment.

A much later system described in Belgium Pat. No. 724,318 overcame most of the above objections. It can handle messages of any length and does this without introducing delay. In this system, the central station issues in succession a pair of control signals. The first control signal is a switching signal which permits any remote station requiring service to switch a shift register window in series with the serial loop. The second signal will only reach the first shift register in the series of registers. The other downstream registers receive the first signal from the register of the prior upstream register. Receipt of two first control signals in succession cause the downstream terminals to switch out. The upstream terminal which receives both the first and second signals transmits its data and then takes over the function of the central by generating the pair of control signals for transmission downstream only.

The above method of control solves many of the problems found in the method of control described by Unk; however, the central station loses control since the transmitting terminals each in succession generate the control signal pairs as they complete transmission. In addition, each station must be equipped to generate these signals for issuance when it completes transmission.

SUMMARY OF THE INVENTION

The invention contemplates a serial loop data transmission system in which a central station is connected to the first and last stations of a plurality of serially connected remote stations for transmitting data signals to and receiving data signals from said remote stations. Said central station is adapted to transmit a first unique multibit poll enabling signal followed by a plurality of unique multibit framing signals whenever data transmission from the remote stations to the central station is desired. Each of said remote stations includes a register means for receiving and storing the multibit signals received at the remote station and means for examining in said received multibit signals. Means at each said remote station responsive to the examining means for initiating the transmission of a unique multibit control signal when the poll enabling signal is detected or when a multibit framing signal is received following receipt of a said multipoll enabling signal provided the remote station has data to send; and means for initiating transmission of data if a multibit framing signal is received following transmission of said multibit control signal.

DESCRIPTION OF THE PREFERRED EMBODIMENT

Figure 1:
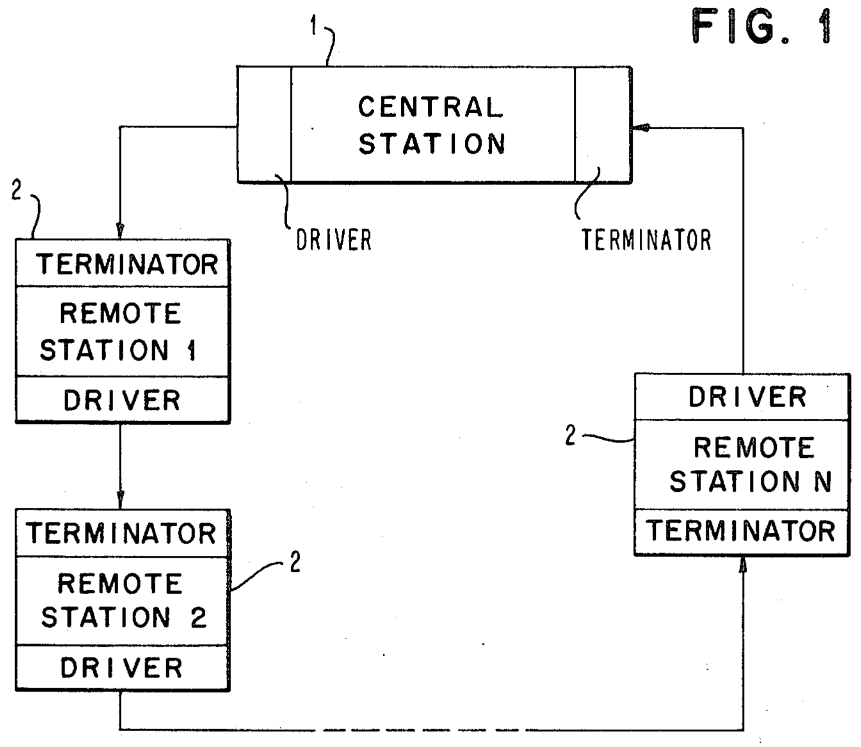
FIG. 1 is a diagram of a serial loop communications system constructed according to the invention.

In FIG. 1, a central station 1 which may include a computer or be connected to a computer is provided with a driver section and a terminating section. The driver section conditions signals from the central station and transmits them over a transmission medium to a terminating section of a first remote station 2. If the data being transmitted over the communications medium is destined for that station, the data is received by the remote station. If the data being transmitted is for a subsequent station in the serially connected group of stations, the station bypasses the data and passes it on via its driver section to the terminator section of the next remote station 2. The remaining stations are connected in the same fashion from the driver of the preceding station to the terminator of the subsequent station until the last remote station receives a signal via its terminator and transmits it via its associated driver back to the central station terminator.

The messages from the central station to any of the remote stations will bear addresses which will be detected by the remote stations when the message reaches that station and the data for that station will be registered or received at the addressed remote station. This technique for transmitting data from the central station to the remote stations is not unlike those previously referred to in the specification. However, the techniques employed for transmitting data from any of the remote stations to the central station vary significantly and will be described in detail during the course of the description of the following figure.

Figure 2:
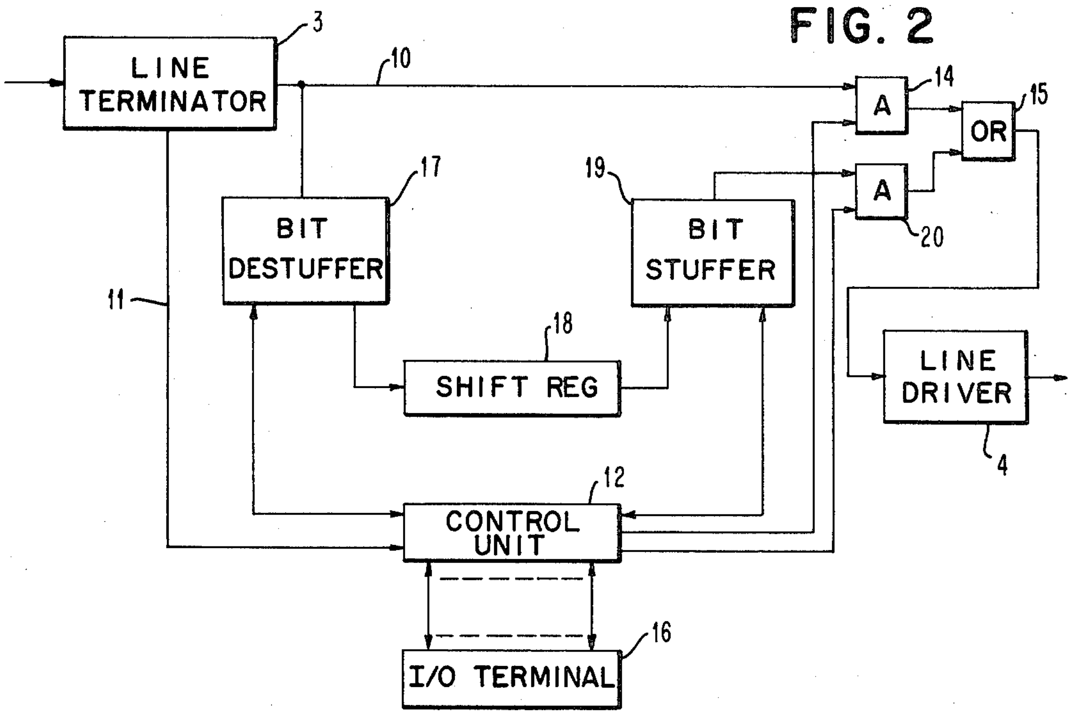
FIG. 2 is a block diagram of a remote station illustrated in FIG. 1.

FIG. 2 is a block diagram of the data and signal flow in a single remote station illustrated in FIG. 1. The communications network from the central or a preceding station is connected to a line terminator circuit 3 which will have a form dictated by the type of signalling utilized in the communications network. The terminator will provide a first output 10 which consists of two DC signal levels identifying binary coded data. Thus, DC signals signifying one binary state will have one DC voltage while those signals signifying the other binary state will be represented by DC signal voltages of another level. In addition, the line terminator will provide clocking signals on an output 11 which will be utilized for processing the data signals supplied on output 10. These clocking signals are applied to a control unit 12 which controls the operation of the remote station. The data signals on output 10, if they are not destined for the remote station, will be applied via an AND gate 14 and an OR circuit 15 to the line driver 4 associated with the station. AND gate 14 is controlled by the control unit 12. If the data signals are for the input/output terminal 16 associated with the remote stations, they will be passed through a bit destuffing circuit 17 and loaded into a shift register 18 from which they will be transmitted to the input/output terminal 16 under control of control unit 12. Data signals originating in the input/output terminal 16 will, under conditions which will be described, be inserted in the shift register 18 and pass through a bit stuffing circuit 19 and then through an AND circuit 20 and OR circuit 15 to the line driver 4. Bit destuffer 17 and bit stuffer 19 as well as AND circuit 20 are under control of the control unit 12. All of the circuits described above in FIG. 2 will be described in greater detail in connection with the description of FIG. 4 which will follow later.

Data transmission from the input/output terminal 16 connected via the remote station to the loop is under control of the central station illustrated in FIG. 1. The central station will, under its program control periodically or when needed, provide for transmission of data from the input/output terminal 16 to the central station. This is accomplished by transmitting a first unique multibit control signal, hereinafter referred to as Ⓟ. At this time, all of the remote stations will, as will be clear from the description which follows, be passing data directly through their AND circuits 14. Thus, all of the remote stations will receive the unique Ⓟ control signal at substantially the same time. That is, the difference in time between the various stations will be determined only by the delays in the communications media and no delay will be introduced because of the shift register 18 associated with the terminals. After transmitting the Ⓟ character, the central station will transmit a plurality of unique framing signals hereinafter referred to as F.

Figure 3:
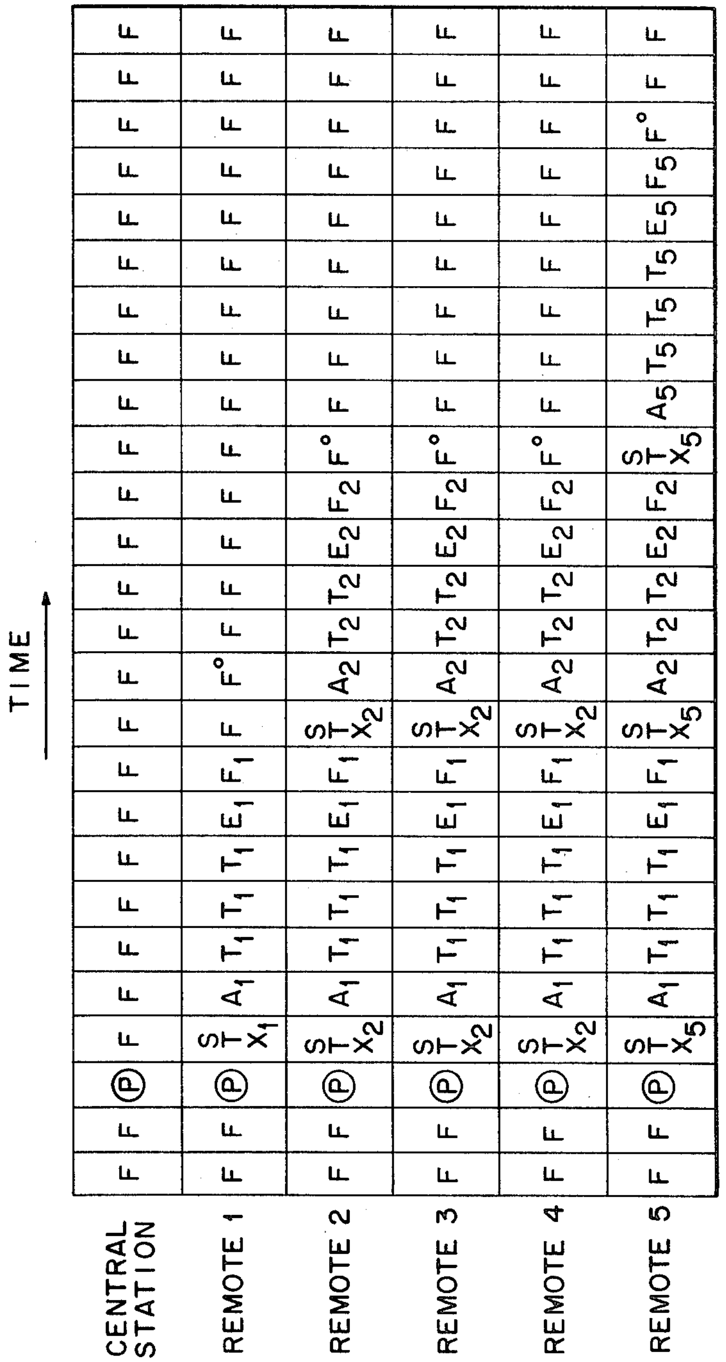
FIG. 3 is a table indicating data flow at different points in the system illustrated in FIG. 1.

At this time, the central station takes no further action. The sequence of framing signals F continues uninterrupted until all of the remote stations desiring service have had an opportunity to transmit the data required to be transmitted to the central station. The table illustrated in FIG. 3 shows a sequence of transmission for a five-terminal loop configuration in which terminals 1, 2 and 5 desire to transmit data. While only five terminals are considered in the example, systems of the type described herein would normally handle up to one hundred or more remote stations. The exact number will, of course, depend upon the amount of data and the frequency with which data is being transmitted from each of the remote stations.

The table is organized such that time progresses from the left to the right. The output from the central stations appears on the first line and the output from the remote stations in the order in which they are connected on the loop are indicated in order. The signals indicated in the table appear at the output of the identified station. Thus, the signal appearing at the output of remote station 5 would actually be the signal received at the central station. Also the signal appearing at the output of remote station 1 would be the signal which would appear at the input of remote station 2. Thus, for any station while only the output signal is indicated, the input signal for that station is found in the line immediately above. The central station transmits several framing signals which assure synchronization of all of the remote stations connected to the loop. These signals assure both bit and character synchronization. Following transmission of the two framing signals, the central station transmits the Ⓟ signal and each of the stations connected to the loop receive substantially simultaneously the Ⓟ signal. Following transmission of the Ⓟ signal, those stations requiring service, in the illustrated case, stations 1, 2 and 5, load a unique control signal labeled "STX" into their respective shift registers 18. The table shows three such signals appearing in column 4. These are STX1, STX2 and STX5. Stations 3 and 4 do not load the STX signal since they do not require service at this time. At the time the STX signal is loaded into the shift register 18, AND gate 14 is disabled and AND gate 20 is enabled. This, in effect, places the shift register 18 for remote stations 1, 2 and 5 in series with the communications network and with each other.

During transmission of the first frame signal following transmission of the Ⓟ, only remote station 1 receives the frame character. The framing character received by remote station 1 causes STX1 to be transmitted to terminal 2. STX1 received by terminal 2 causes STX2 to be transmitted past remote stations 3 and 4 and received by station 5. STX5 previously loaded by remote station 5 is transmitted to the central station. Since remote stations 2 and 5 did not receive a framing signal following transmission of their STX character, they restore their switching gates 14 and 20 to the previously described state. That is, gate 14 transmits signals received from the line terminator directly to the line driver. At this time, remote station 1 having received the frame signal F while it transmits the STX signal is authorized to transmit. During receipt of the next framing signal from the central, the address A1 from the remote station 1 is transmitted. This address bypasses all of the downstream stations and is received by the central station. During subsequent framing signals, the first remote station transmits the first, second and third text portions of its message. This is followed by an ending data portion which may include error checking data. Remote station 1, after transmitting the ending portion, transmits a complete framing signal identified as $F_1$. The receipt of the $F_1$ signal by remote stations 2 and 5 causes them to again transmit their respective STX signals and the process previously described with respect to remote station 1 is repeated for remote stations 2 and 5. The process will continue until all stations desiring service have an opportunity for service. Station 1 will be prevented from transmitting data again since it has seized an opportunity. Stations 3 and 4 still may transmit data since they have not had at this time an opportunity to send data. As soon as station 2 has completed sending data, stations 3 and 4 will again have an opportunity to transmit. If they pass the opportunity at this time, they will no longer be able to send data to the central station until another Ⓟ is received.

The framing signal $F^0$ indicated following transmission of the frame $F_1$ is an adjusted frame for restoring character synchronization. Due to the use of a bit stuffing circuit 19, the frame following the transmission of the frame originating at the remote station must be adjusted to provide character synchronization. Bit stuffing is employed to prevent the occurrence of a framing signal in a stream of data. For example, the framing signal selected for description in this embodiment utilizes seven ones and a zero in an eight-bit character organization. It is possible for seven ones to occur in data within two consecutive characters, thus a count in bit stuffer 19 is maintained of consecutive ones and as soon as six consecutive ones are detected, a zero is automatically inserted between the sixth and the seventh position regardless of whether the seventh bit is zero or one. In view of this, the received signal must be passed through a bit destuffing circuit which, if it detects six contiguous one bits, removes the seventh bit provided it is a zero from the data stream. If less than multiples of eight bits are removed, character synchronization is destroyed and must be restored at the time indicated by $F^0$. This is accomplished by forcing the transmission of one bits in excess of seven during this period until synchronization with the framing signals from the central station is achieved. This will be achieved when the zero bit is ready to transmit at the line driver following transmission of seven or more one bits. The operation of bit destuffing circuit 17 and bit stuffing circuit 19 will be described in detail in connection with the description of FIG. 4. When the central station receives two or more frames in a row, it is thus informed that all of the stations having data for the central station have had an opportunity to transmit data to the central station and the central station may under program control or hardware control institute another cycle of operation or may revert to an addressing mode in which data, as previously described, is transmitted to the remote stations.

If another transmission cycle from the remote stations to the central station is desired, the central station will generate another Ⓟ and revert to transmitting framing signals, and the process described above will be repeated. As previously stated, once a remote station has the opportunity to transmit and is not ready to transmit and passes the opportunity, it may no longer transmit thereafter. The opportunity to transmit occurs following receipt of a Ⓟ. Thus, when remote stations 3 and 4 have not attempted to seize the communications line prior to receiving $F_2$, $F^0$ following receipt of the Ⓟ, they are precluded from transmitting at this time. If remote stations 3 or 4 had required service prior to receipt of $F^0$ following $F_2$, they could at that time have transmitted their STX signal and bid for the line. If both stations 3 and 4 had bid for the line at that time, station 3 would have acquired the line. In this event, station 4 would have another opportunity to transmit at the termination of station 3's transmission if it had not bid for the line at that time.

Figures 4, 4A:
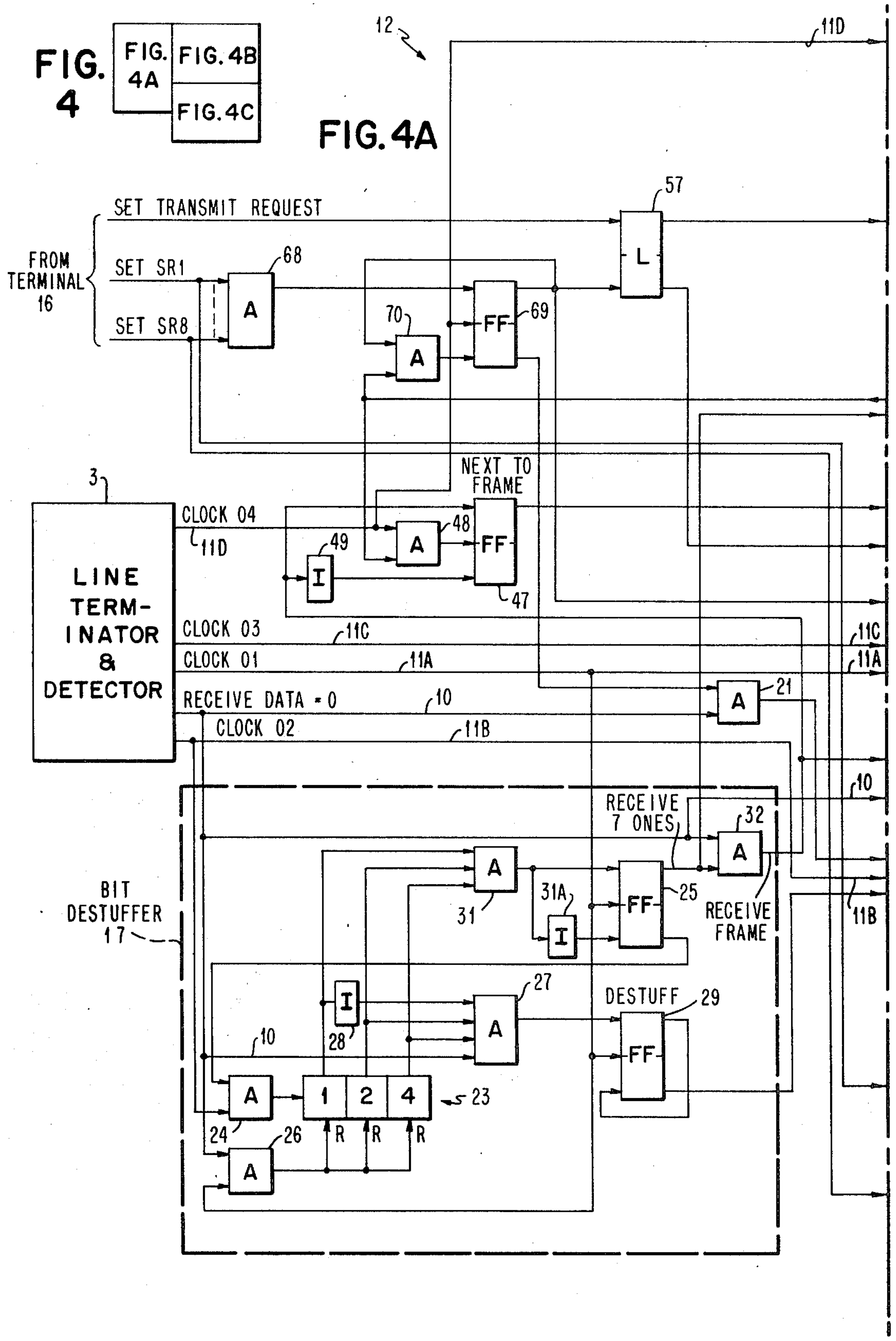
FIGS. 4, 4A, 4B, and 4C are, when combined as illustrated in FIG. 4, a detailed block diagram of a single remote station illustrated in FIG. 2.
Figure 4B:
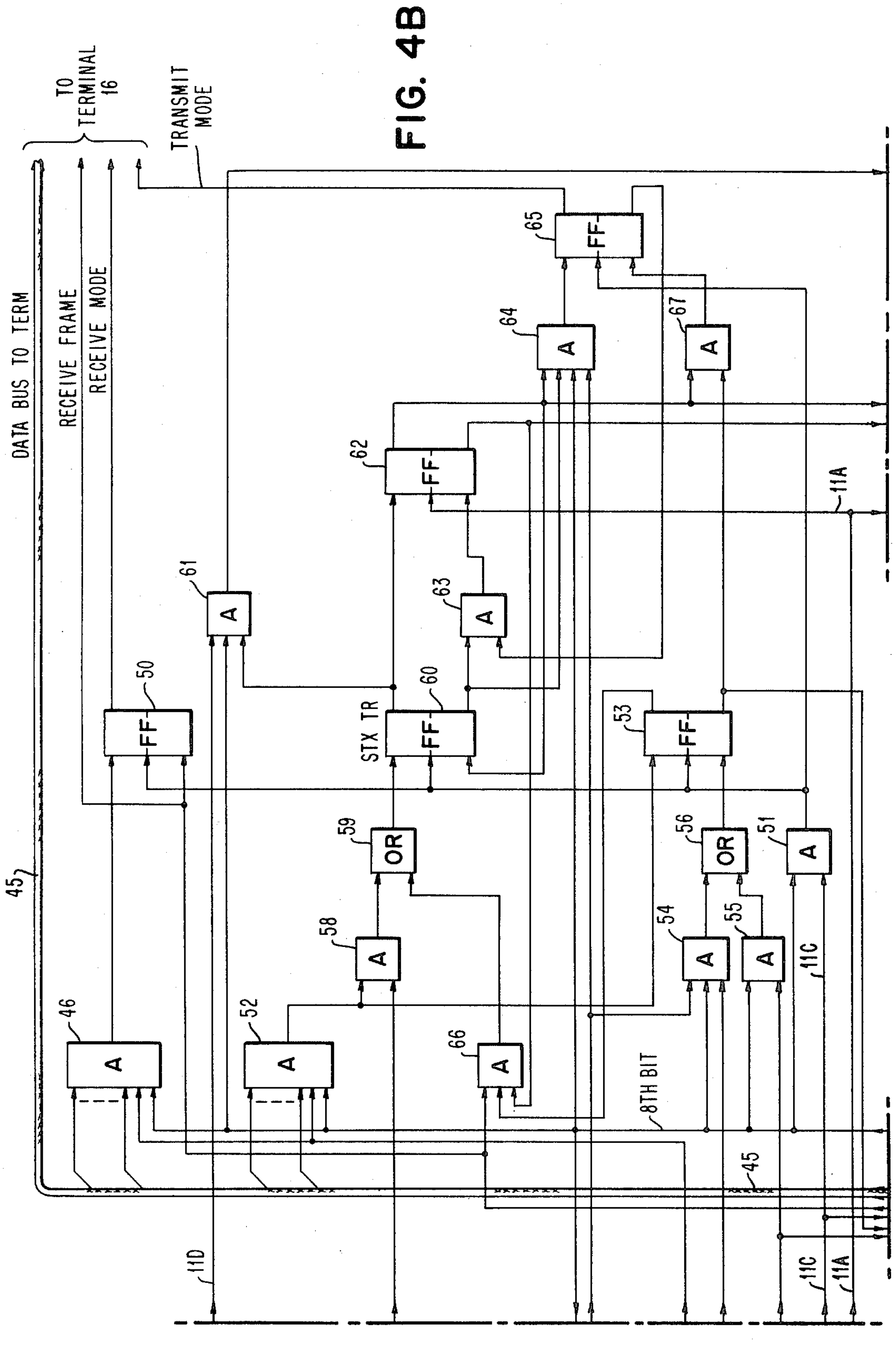
Figure 4C:
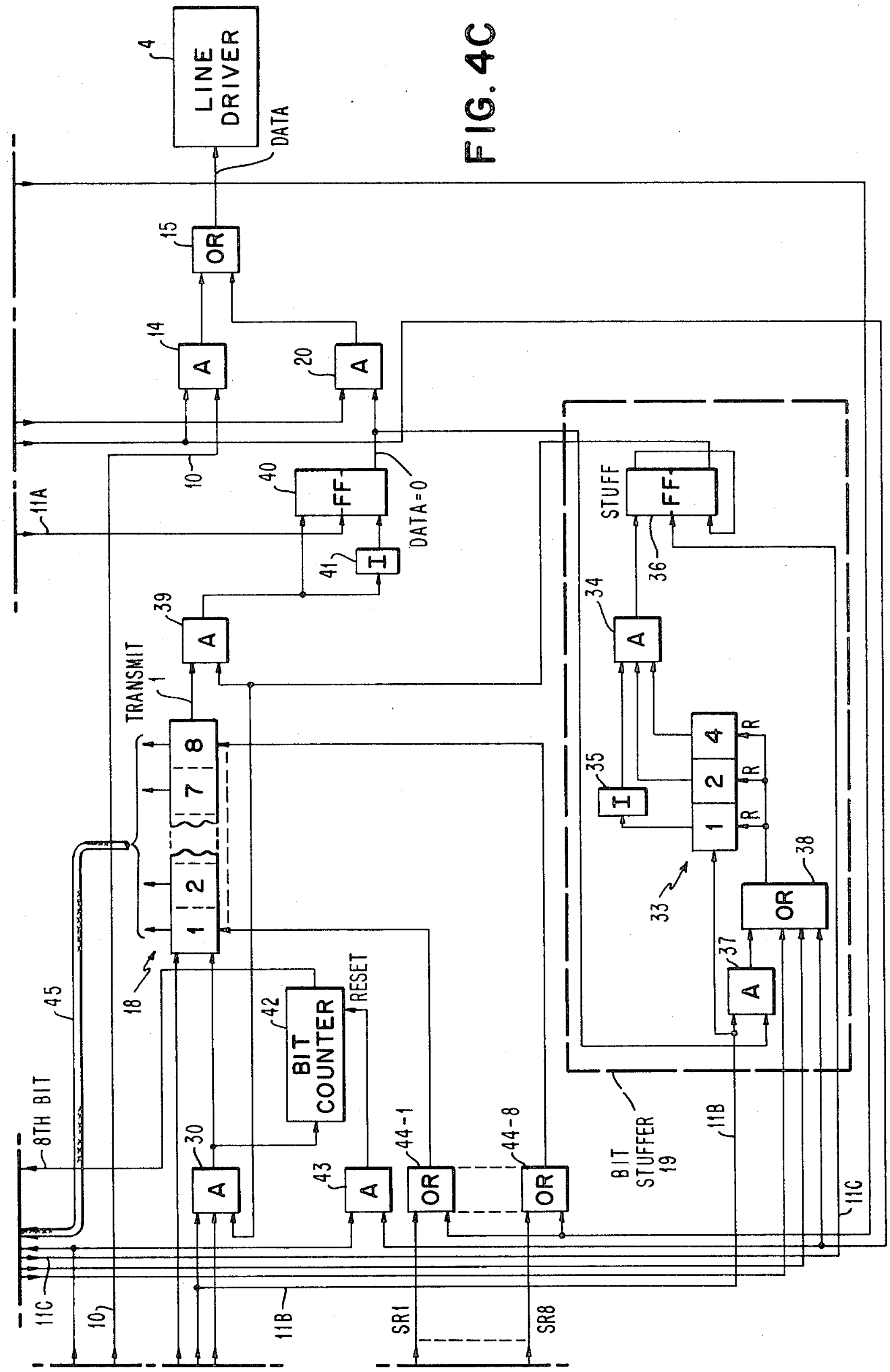

In FIGS. 4, 4A, 4B, and 4C, elements previously described bear the same reference numeral. The circuit illustrated includes all of the components comprising bit destuffer 17, bit stuffer 19, shift register 18, control unit 12, AND gates 14 and 20 and OR gate 15. The I/O terminal 16 is not illustrated; however, it may take any conventional form and conventional control lines and data buses from and to the terminal are illustrated in FIG. 4.

The data supplied on output 10 from the line terminator 3 is as previously described connected directly to AND gate 14. AND gate 14 has another input which controls the gate. When this input is properly energized, the data received by the line terminator is passed directly through the gate and OR gate 15 to the line driver 4 associated with the remote station. In addition, the output 10 is connected to one input of another AND gate 21. When properly enabled, AND gate 21 applies the output on 10 through gate 21 to the input of shift register 18 causing the data received by the line terminator to be registered in register 18. All of the data received by the line terminator is inserted into shift register 18 except under one condition which will be subsequently described. Thus, shift register 18 contains a limited prior bit history of the line data at all but one specific time.

The clocking signals from the line terminator appear on four lines 11A, B, C, and D. The four clock pulses are non-overlapping and divide each received bit time into four equal parts and are synchronous with the data received. Thus, the clock pulse appearing on line 11A occurs during the early part of the bit time. This is followed by the clock pulse on a line 11B which is followed by the clock pulse on line 11C and then by the clock pulse on line 11D. These are referred to on the drawing and in the description as clock phases 1, 2, 3 and 4, respectively. For any given bit time, clock phase 1 will precede clock phase 2 which precedes clock phase 3 which precedes clock phase 4 and none of the above clock phases are overlapping and all occur within a single bit time.

The bit stuffing circuit 17 includes a binary counter 23. This counter is stepped each time a phase 2 clock pulse issues from the line terminator circuit. The phase 2 clock pulse is applied to the stepping input of counter 23 via an AND gate 24. The other input of AND gate 24 is connected to the off output of a trigger 25. Trigger circuit 25 is an edge triggered flip-flop which responds only to the off to on transition of the clock signals. The on input and the off input are mutually exclusive. If the on input is properly energized and the clock transition occurs, the flip-flop turns to the on position. If the off input is properly energized and a clock transition occurs, the flip-flop turns to the off position. There is no change if either gate is not properly energized. The trigger is illustrated as a block throughout the diagram with the legend FF within the block. The upper input is the on input and the lower input is the off input. The upper output is energized when the flip-flop is turned on and the lower output is energized when the flip-flop is turned off. Thus, when the trigger 25 is in the off state, gate 24 is enabled. The operation and function of this trigger will become apparent as the description continues. The reset inputs of binary counter 23 are connected by an AND circuit 26 to the output 10 from the line terminator which upon the occurrence of a zero bit provides an appropriate signal during clock phase 1 which resets the counter 23. With this stepping and resetting arrangement described, counter 23 counts consecutive one bits. Each time a zero bit is received, the output 10 is of an appropriate level for resetting counter 23 via gate 26.

A four input AND gate 27 has one input connected to the first stage of counter 23 by an inverter 28 and two inputs connected to the second and third stages and thus will provide an appropriate output when the counter 23 attains a count of six provided a subsequent received bit is a zero. The output of AND circuit 27 is connected to the on input of a trigger circuit 29 which is set to the on state during clock phase 1. Since trigger 29 is set to the on state during the clock phase 1, this occurs during the next bit period after the sixth consecutive one is detected by the count of six in counter 23 except in those cases where the seventh bit is a one. As soon as trigger 29 is turned on, upon the occurrence of a count of six, clocking pulses to the shift register 18 are removed since the AND circuit 30 connecting the phase 2 clocking pulses used for clocking the data into shift register 18 is blocked. Trigger 29 is immediately reset during phase 1 of the next bit period since the on output is fed back to the off input. This arrangement removes a single clocking pulse appearing during the seventh bit time or the bit time immediately following the detection of six one bits. Since the clocking pulse is removed from the shift register 18, the seventh bit or the bit following receipt of six one bits is not introduced into the shift register 18; thus, causing the zero which normally follows six ones as defined above to be dropped or destuffed. The enabling signal is reapplied at phase 1 of the next bit period and a subsequent phase 2 clock pulse will be applied to the shifting input of the register 18 via AND circuit 30 after the trigger 29 is turned to the off state. In addition, an AND circuit 31 detects an all ones condition in counter 23 and turns trigger 25 on. As soon as trigger 25 is turned on, AND gate 24 becomes disabled and further phase 2 clock pulses will not be counted in counter 23. Only upon the receipt of a subsequent zero bit via the line terminator and AND circuit 26 will gate 24 be again enabled.

Trigger 25 will remain in the on-state following receipt of seven ones until the receipt of a subsequent zero. By definition set forth above, receipt of the subsequent zero indicates reception of a frame. Upon receipt of a subsequent zero counter 23 resets causing the output of AND gate 31 to fall. When this occurs, trigger 25 is reset via an inverter 31A connected between the output of AND gate 31 and the off input of trigger 25. The on output from trigger 25 is applied to an AND circuit 32 which is also connected to the output 10 from the line terminator circuit and thus develops an output at the occurrence of the first zero bit following the receipt of seven ones which indicates that a framing signal has been received. How this framing signal is utilized will be discussed later.

The bit stuffing circuit 19 is substantially similar in construction and operation to the bit destuffing circuit described above; however, it does not provide frame detection or provide a signal upon the detection of the seven consecutive one bits since this function is not necessary in the bit stuffing mode of operation. The bit stuffer includes a counter 33 for counting phase 2 clock pulses and an AND circuit 34 for detecting the value of six in counter 33. This AND circuit like AND circuit 27 is connected by an inverter 35 to the first stage of counter 33 and directly to the second and third stages of the counter. The output of AND circuit 34 is connected to the on input of a trigger 36 which operates exactly as trigger 25; however, switching occurs on clock phase 3. The clock phase 2 signals are applied to one input of an AND circuit 37 which is enabled whenever a zero data bit is being transmitted to the driver associated with the remote station. Thus, each time a zero is transmitted, AND gate 37 develops an output which is applied via an OR gate 38 to the reset inputs of counter 33. In addition to the output from AND gate 37, OR circuit 38 is connected to three other inputs which also reset the counter 33. These will be discussed later. The off output state of trigger 36 is connected to AND circuit 30 and thus when six ones are detected by AND circuit 34, trigger 36 is set on disabling AND gate 30. When AND gate 30 is disabled, a subsequent clock phase 2 signal is not applied to the shift register 18 and data during that clock phase is not shifted out of the output of the shift register. This causes a zero data bit to be transmitted via the line driver associated with the remote stations.

The output from shift register 18 indicating a one condition is applied to one input of an AND circuit 39 which is enabled when trigger 36 resides in the off state. Thus, signals indicating a one bit at the appropriate level are provided at the output of AND circuit 39 as long as stuffing is not required. The output of AND circuit 39 is applied to the set input of a trigger circuit 40 and sets the trigger 40 on during clock phase 1. In addition, the output of AND circuit 39 is passed through an inverter 41 and applied to the off input of trigger 40 and sets the trigger 40 to the off state when a zero signal is transmitted from the shift register 18. Thus, when trigger circuit 40 is set to the zero state, this indicates zero data is to be transmitted to the line. This output from trigger 40 is applied to AND circuit 20 previously described and via AND circuit 20 to OR circuit 15 to the line driver circuit 4. AND circuit 20 is enabled whenever transmission is authorized for the remote station. The generation of the enabling signal will be described later.

The receive frame signal supplied at the output of AND circuit 32 is applied to a bit counter 42 via an AND circuit 43 to reset the bit counter 42 each time a receive frame signal is generated. Thus, counter 42 at a count of eight which is designed to operate with the embodiment being described provides a signal which is used for character synchronization. AND gate 43 is enabled at all times when transmission from the remote station does not take place by a signal, the generation of which will be described later. Bit counter 42 counts phase 2 clock pulses passed by AND gate 30 and provides an output each time the eighth bit in the sequence of clock pulses is counted. This eighth bit output signal will be utilized for timing purposes in a number of the circuits which will be described.

The set inputs for the eight positions of shift register 18 are connected via eight OR circuits 44–1 — 44–8 to an eight-line output bus from the terminal 16. For the purposes of clarity, only the first and eighth OR circuits and first and eighth lines are shown connected to the set inputs of the first and eighth positions, respectively of the register. The eight output positions of the shift register 18 are connected to an output bus 45 from which various devices which will be described may monitor the contents of register 18 during specific times.

An AND gate 46 is selectively connected to the output bus 45 in such a way that it will detect a unique address for the particular remote station that it is connected to. The detection occurs during the eighth bit time, as controlled by bit counter 42, following receipt of the received frame signal. The eighth bit time is secured simply by connecting the eighth bit output of counter 42 to AND circuit 46. The eighth bit time following receipt of the frame signal is provided by a trigger 47. Trigger 47 is set to the on state by the output of AND gate 32 during the eighth bit time and clock phase 4, which is provided by an AND circuit 48 which receives the eighth bit output of counter 42 and the phase 4 clock for selecting the appropriate setting time for the trigger 47. An inverter 49 connected between the output of AND gate 32 and the off input to trigger 47 causes the trigger to reset to the off state eight bits later. If at the appropriate time, AND gate 46 decodes the specific address for the remote station, it provides an output which sets a trigger circuit 50 to the on state, thus, signalling received mode to the terminal 16. Trigger 50 is turned on during the eighth bit and clock phase 3. This clock is generated by the output of an AND gate 51 which has the eighth bit output of counter 42 and clock phase 3 applied to its two inputs. Trigger 50 is reset to the off state by a subsequently received receive frame signal provided by the output of AND gate 32 which is connected to the off input of trigger 50.

Another AND gate 52 is selectively connected to the output bus 45 for decoding the Ⓟ signal transmitted by the central station. In addition, AND gate 52 is connected to the on output of latch 47 and to the eighth bit output of counter 42 in the same manner as gate 46 and provides following receipt of a frame an output if the Ⓟ signal is detected. This output when generated is applied to the set input of a trigger 53 and sets the trigger under control of the output of AND gate 51 which coincides with the eighth bit and clock phase 3. Trigger 53 when set to its on state indicates that a polling signal has been received. Trigger 53 will be reset under two conditions determined by AND gates 54 and 55, the outputs of which are applied to the off input of the trigger via an OR circuit 56. AND gate 54 turns trigger 53 off following receipt of seven consecutive ones and no request for transmission from the terminal. AND gate 55 turns trigger 53 off following a completion of transmission of data by the terminal. The inputs to AND gates 54 and 55 will be described subsequently.

The terminal when it desires to transmit data provides a set transmit request signal which is used to set a latch 57 to the on state. The on output of latch 57 is ANDed with the output of AND gate 52 in another AND gate 58. The output of AND gate 58 is applied via an OR circuit 59 to the on input of a trigger 60 which provides a signal controlling the generation of the STX signal. Trigger 60 is controlled by the output of AND gate 51 which is set on or off under control of gate 51. Thus, trigger 60 is set to the on state if the terminal has a transmit request and Ⓟ is decoded. Trigger 60 controls generation of the STX signal. The on output of trigger 60 is connected to one input of an AND circuit 61 which at clock phase 4 and eighth bit time provides an output labeled "SET STX." This output is applied to OR gates 44–1 and 44–8 to alter the character then residing at that time in the shift register 18 to the STX character.

The on output of trigger 60 is directly connected to the on input of another trigger 62 which controls transmission of data from the shift register 18 or directly through the remote station and is connected to gate 20. Thus, trigger 62 is turned on when trigger 60 turns on. The data path to the line driver is from the shift register 18 to AND gate 20 and OR gate 15 to the line driver 4. When trigger 62 is in the off state, AND gate 14 is enabled and the data path bypasses the remote station. The on output of trigger 62 is connected back to the off input of trigger 60 and turns trigger 60 off on the eighth bit following the time that trigger 62 is turned on. Thus, AND gate 20 will remain enabled for at least eight bit periods to assure transmission of the STX character previously set into the register 18. The off output of trigger 60 is connected via an AND gate 63 to the off input of trigger 62 and will turn trigger 62 to the off state whenever the AND gate 63 is enabled. The on output of trigger 62 is applied via an AND gate 64 to the set input of a transmit mode trigger 65 and turns trigger 65 to the on state when the other three inputs to AND gate 64 are properly satisfied. The first of the three inputs is connected to the off output of trigger 60 which turns off eight bits following the turn-on of trigger 62. The second input is connected to the eighth bit output of bit counter 42, thus, restricting the development of the output for turning on trigger 65 during the eighth bit time. The final input to AND gate 64 is connected to and on output of latch 25 which indicates the receipt of seven ones. Thus, a transmit mode, indicated by the on state of trigger 65, will not occur unless seven consecutive ones are received following the setting of trigger 62 to the on state.

Triggers 60 and 62 may also be turned on via an alternate path through OR circuit 59. An AND gate 66 is provided with three inputs. One of these is connected to AND gate 32 and receives the receive frame signal from the output of AND gate 32. The second input is connected to the on output of latch 53 which is set upon receipt of the Ⓟ signal. The third and final input is connected to the off output of trigger 62. Thus, if trigger 62 is off, latch 53 has been previously set, and upon the receipt of a frame, a signal is generated at the output of AND circuit 66 which is passed via OR circuit 59 and accomplishes the same sequence of steps which were previously described above. That is, it causes the transmission of the STX signal and the proper switching of gates 14 and 20 and the setting of the transmit mode latch 65 to the on condition under the circumstances previously described. When trigger 53 is reset to the off state as previously described, a signal is generated at the output of an AND circuit 67 which causes the trigger 65 to turn off. When trigger 65 turns to the off state, transmit trigger 62 is turned off via AND gate 63.

As previously described, the terminal upon completion of transmission of its data and error checking information transmits or generates a frame signal. This is sent over conductors labeled "SET SR1 – SR8." An AND circuit 68 selectively connected to these conductors decodes the frame signal and provides an output which sets a trigger 69 to the on state. As soon as trigger 69 is set to the on state which occurs during clock phase 4, the latch 57 is reset. In addition, the on output of trigger 69 is applied to AND circuit 55 which causes, at bit eight time, the trigger 53 to reset. The on output of trigger 69 is connected via an AND gate 70 to the off input of latch 69 and turns the latch off at bit eight time and clock phase 4. As soon as trigger 69 turns off, AND gate 21 is again enabled and data coming in from the line terminator on the output 10 is passed through AND gate 21. It is essential during the transmission of this frame that data bits on the output 10 not be introduced into the shift register since this causes the shift register to go to an all ones position as the frame previously loaded in is shifted out. This assures that subsequent transmission regardless of how many zeros have been stuffed will include a frame having at least seven one bits.

While the invention has been particularly shown and described with reference to a preferred embodiment thereof, it will be understood by those skilled in the art that various changes in form and details may be made therein without departing from the spirit and scope of the invention.

What is claimed is:

1. A method of operating a serial loop communications network which includes a central station connected to the first and last stations of a plurality of serially connected remote stations for receiving data signals from said remote stations comprising the steps of:

at said central station generating and transmitting to the first remote station of the serially connected stations a first unique serial multibit poll enabling signal and a plurality of second unique multibit serial framing signals when transmission of data from the remote stations to the central station is to be initiated;

at each of said remote stations, monitoring the signals received via the network to detect the receipt of said first unique multibit poll enabling signal and said second unique multibit framing signal, when transmission of data to the central station is required generating and transmitting a third unique multibit control signal to a subsequent station upon receipt of a said first unique multibit poll enabling signal or upon receipt of a said second unique multibit framing signal received following receipt of the said first unique multibit poll enabling signal, initiating the transmission of data signals following transmission of said third unique multibit control signal only when a said second unique multibit framing signal is received immediately following transmission of the said third unique multibit control signal, and inhibiting further transmission of data signals following the transmission of one complete message when the remote station has data to send, or the receipt of a said first unique multibit poll enabling signal and a following second unique multibit framing signal when the remote station has no data to send at the time of receipt of said signals until a subsequent first unique multibit poll enabling signal has been received.

2. The method set forth in claim 1 in which at each of said remote stations following the transmission of data signals a said second unique multibit framing signal is generated and transmitted to the next station to thereby delineate the data signals when received at the central station.

3. A serial loop data communications system comprising:

a central station adapted to transmit and receive data signals;

a plurality of remote stations adapted to receive and transmit data signals;

a transmission medium interconnecting said remote stations in series and said central station to the first and last remote station to thus form a serial transmission loop from the central station through the serially connected remote stations and back to the central station;

said central station including means for transmitting to the first remote station a first unique serial multibit poll enabling signal followed by an uninterrupted plurality of second unique multibit serial framing signals when transmission of data signals from the remote stations to the central station is desired;

each of said remote stations including, means for receiving and storing multibit signals received at the station via the transmission medium, decoding means responsive to the stored signals in the receiving and storage means for detecting said first and second unique multibit signals and providing first and second output signals upon detection of said first and second unique multibit signals, respectively, means responsive to said first output signal for transmitting a third unique multibit control signal when the station has data signals to transmit, means responsive to said first and second output signals for transmitting said third unique multibit control signal when the station has data signals to transmit, and means responsive to said second output signal for transmitting data signal when said second output signal is provided immediately following transmission of said third unique multibit control signal.

4. A serial loop data communications system as set forth in claim 3 in which each of said remote stations includes, first means for inhibiting the transmission of data signals following the transmission of a complete message, when the station has data to send and second means for inhibiting the transmission of data signals upon receipt of said first and second output signals when the station does not have data signals to send.

5. A serial loop data communications system as set forth in claim 4 in which each of said remote stations includes means for generating and transmitting a said second unique multibit framing signal immediately following the last data signals to delineate the data signals when received at the central station.

* * * * *